US008963940B1

(12) United States Patent
Riach et al.

(10) Patent No.: US 8,963,940 B1
(45) Date of Patent: Feb. 24, 2015

(54) ISOCHRONOUS HUB CONTRACTS

(75) Inventors: Duncan A. Riach, Brighton (GB); Robert A. Alfieri, Chapel Hill, NC (US); Brijesh Tripathi, Santa Clara, CA (US); Patrick R. Marchand, Apex, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1919 days.

(21) Appl. No.: 11/695,557

(22) Filed: Apr. 2, 2007

Related U.S. Application Data

(60) Provisional application No. 60/864,774, filed on Nov. 7, 2006.

(51) Int. Cl.
*G09G 5/36* (2006.01)
*G06T 1/00* (2006.01)
*G06T 1/60* (2006.01)

(52) U.S. Cl.
USPC ............................ 345/545; 345/501; 345/530

(58) Field of Classification Search
CPC .......... G09G 5/393; G09G 5/39; G09G 5/395
USPC ......................................... 345/501, 530, 545
See application file for complete search history.

(56) References Cited

U.S. PATENT DOCUMENTS

| | | | | |
|---|---|---|---|---|
| 6,046,709 | A * | 4/2000 | Shelton et al. | 345/1.1 |
| 6,501,441 | B1 * | 12/2002 | Ludtke et al. | 345/1.1 |
| 6,924,843 | B1 * | 8/2005 | Yamazaki et al. | 348/423.1 |
| 7,079,128 | B2 * | 7/2006 | Kim | 345/213 |
| 7,692,642 | B2 * | 4/2010 | Wyatt | 345/211 |
| 2004/0012581 | A1 * | 1/2004 | Kurokawa et al. | 345/204 |

* cited by examiner

*Primary Examiner* — Joni Richer
(74) *Attorney, Agent, or Firm* — Patterson & Sheridan, LLP

(57) ABSTRACT

One embodiment of the invention sets forth a method for transmitting display data to a display device. The method includes the steps of receiving a contract for a frame of display data, preparing the frame of display data to ensure the timing requirements of the display device can be satisfied based on the contract, and transmitting the frame of display data to the display device while the contract is pending.

20 Claims, 7 Drawing Sheets

ISOCHRONOUS HUB CONTRACTS

CROSS-REFERENCE TO RELATED APPLICATIONS

This application claims the benefit of the U.S. Provisional Application titled, "Isochronous Hub Contracts," filed on Nov. 7, 2006 and having application Ser. No. 60/864,774. This related application is hereby incorporated by reference in its entirety.

BACKGROUND OF THE INVENTION

1. Field of the Invention

Embodiments of the present invention relates generally to displaying data on a display device and more specifically to isochronous hub contracts.

2. Description of the Related Art

A conventional display system includes a display device, a capture unit, and a memory subsystem. The display device, as an output isochronous function, sends requests to the memory subsystem to retrieve the display data. Each of these requests normally pertains to only a small portion of data. To ensure the timing requirements of the display system are satisfied, the display device negotiates a priority scheme with the memory subsystem to handle the requests. Specifically, each of the requests is marked with a certain criticality level. So, if a request is for a real-time application and is thus marked as critical, the memory subsystem gives priority to serving such a request while placing other less-than-critical requests on hold.

However, this dependency between the display device and the memory subsystem leads to a number of undesirable effects. One, because each request is only for a small portion of data, many requests, with some being critical, need to be made every frame. Tracking whether all these requests meet the timing requirements of the display system becomes cumbersome and difficult. Further complicating the matter, due to factors such as the criticality of the requests or the depth of latency buffers that temporarily store the requested data, the timing requirements of the display system may change from one frame to another or even during a frame. Two, neither the display device nor the memory subsystem can be rigorously tested in a standalone fashion because of the dependency between them. Without the standalone stress testing, this conventional display system is less reliable, since the conditions leading to the rare but catastrophic failures are unlikely to be detected. Three, every convention display system is forced to be tested for timing requirements with or without design changes. To illustrate, in one scenario, suppose the design of the display system is unchanged, but the memory subsystem can change from chip-to-chip on account of different types and numbers of dynamic random access memories (DRAMs) implemented. Because of the dependency between the display device and the memory subsystem, the testing results for one display system are directly tied to the performance of its memory subsystem. Such test results cannot be reliably reused for another display system, since the memory subsystem there can be different. In another scenario, suppose a slight design change is introduced for the display device in one display system, but the memory subsystems in all display systems are identical. Here, the dependency unfortunately still requires the testing of the entire display system, because any prior testing results are still not portable to validating whether the design change affects the interactions with the memory subsystem.

As the foregoing illustrates, what is needed in the art is a method and system that decouples the display device and the memory subsystem.

SUMMARY OF THE INVENTION

One embodiment of the invention sets forth a method for transmitting display data to a display device. The method includes the steps of receiving a contract for a frame of display data, preparing the frame of display data to ensure the timing requirements of the display device can be satisfied based on the contract, and transmitting the frame of display data to the display device while the contract is pending.

One advantage of the disclosed system is that, once the contract is asserted by the memory subsystem, the display data can be transmitted without the contract being de-asserted until the transmission has been completed. Therefore, an entire frame of data is transmitted with one contract set up between the display device and the memory subsystem. This approach enables a more robust system that can be specifically designed for real-time display requirements and more easily tested across different memory subsystem platforms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
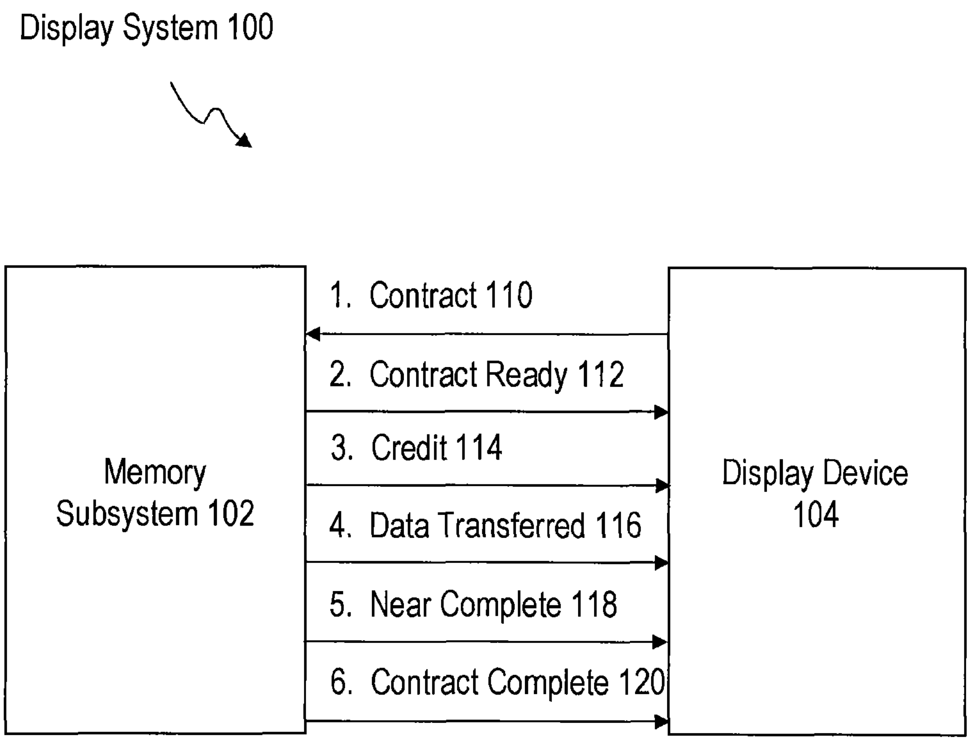
FIG. 1A is a conceptual diagram illustrating a contract-based communication session between a memory subsystem and a display device, according to one embodiment of the present invention.
Figure 1B:
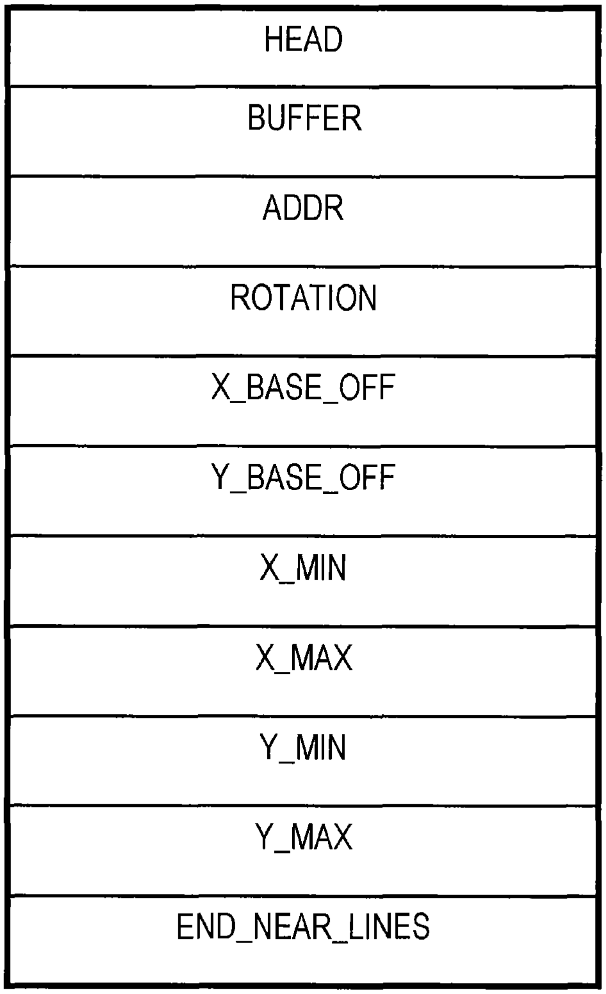
FIG. 1B is a conceptual diagram of a packet containing some of the parameters in a contract, according to one embodiment of the present invention.
Figure 1C:
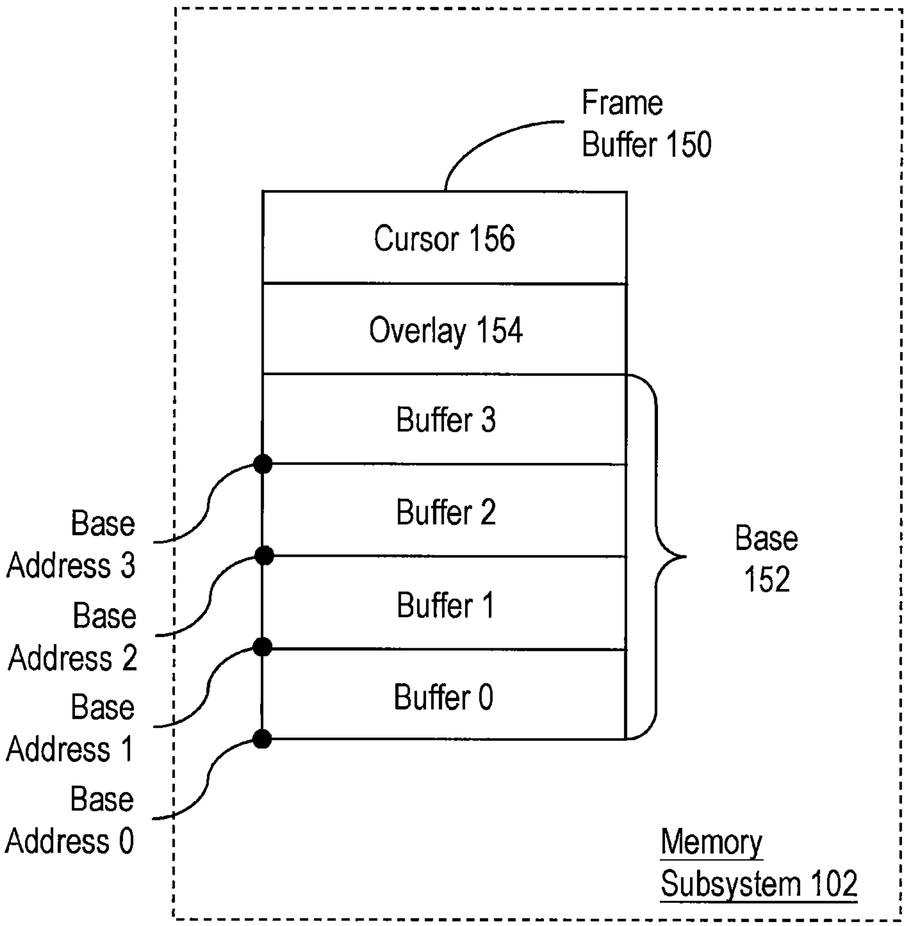
FIG. 1C is a conceptual diagram of a frame buffer containing various types of buffers, according to one embodiment of the present invention.
Figure 1D:
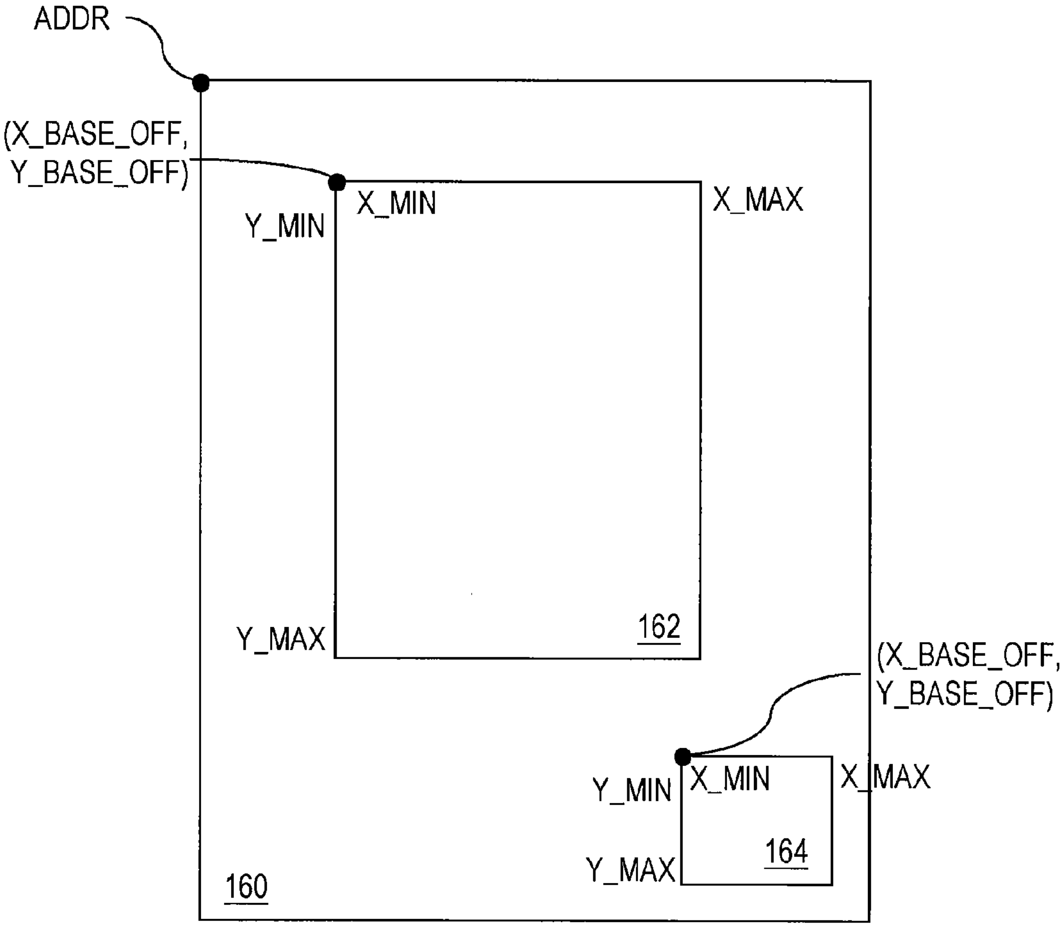
FIG. 1D illustrates a number of display rectangles in the screen space corresponding to the frame buffer shown in FIG. 1C, according to one embodiment of the present invention.

FIG. 1A is a conceptual diagram illustrating a contract-based communication session between a memory subsystem and a display device, according to one embodiment of the present invention. Specifically, unlike the prior art display systems mentioned above, a contract for an entire frame of data is established between the display device 104 and the memory subsystem 102 in the display system 100 prior to any delivery of the requested data. The "contract" here refers to a collection of parameters associated with the request for the frame of data. In one implementation, the contract can be broken into a number of sub-contracts, each of which is represented by a packet shown in FIG. 1B. It should be noted, however, that the terms "contract" and "sub-contract" are used interchangeably throughout this disclosure, unless indicated otherwise. The parameters in the illustrated packet are described as follows:

- HEAD—indicates which head in a multi-head or multi-monitor system the contract is for.
- BUFFER—indicates which buffer the contract is for. A frame buffer 150 in the memory subsystem 102 includes a number of different buffers, such as, without limitation, a base 152, an overlay 154, and a cursor 156 as shown in FIG. 1C. The base 152, the overlay 154, and the cursor buffer 156 correspond to a display rectangle 160, a display rectangle 162, and a display rectangle 164 in the screen space as shown in FIG. 1D. In addition, the base 152 may further contain a number of buffers, such as a buffer 0 with a base address 0, a buffer 1 with a base address 1, buffer 2 with a base address 2, and a buffer 3 with a base address 3.
- ADDR—indicates the base address of the frame buffer 150.
- ROTATION—indicates the read-out order of the buffer specified by the contract. For example, if ROTATION is set to 0 degrees, then the buffer is read out from left to right and then from top to bottom. If ROTATION is set to 90 degrees, then the buffer is read out from top to bottom and then from left to right. If ROTATION is set to 180 degrees, then the buffer is read out from right to left and then from bottom to top. If ROTATION is set to 270 degrees, then the buffer is read out from bottom to top and then from left to right.
- X_BASE_OFF—for overlay and cursor, this is the X offset from the origin of the base.
- Y_BASE_OFF—same as X_BASE_OFF, except from base's Y=0 origin. Referring to FIG. 1D, one set of the (X_BASE_OFF, Y_BASE_OFF) is associated with the overlay, which corresponds to the display rectangle 162, while a different set is associated with the cursor, which corresponds to the display rectangle 164.
- X_MIN—X of the leftmost pixels/chars in a display rectangle.
- X_MAX—X of the rightmost pixels/chars in a display rectangle.
- Y_MIN—Y of the topmost pixels/chars in a display rectangle.
- Y_MAX—Y of the bottommost pixels/chars in a display rectangle. Similar to the (X_BASE_OFF, Y_BASE_OFF) discussions above, one set of (X_MIN, Y_MIN, X_MAX, Y_MAX) is associated with the overlay, while a different set is associated with the cursor.
- END_NEAR_LINES—if non-zero, then a near-complete packet is sent when there are END_NEAR_LINES lines left to send. This gives the display device 104 some time to get ready to receive the next contract.

Referring back to FIG. 1A, after the display device 104 completes sending a new contract packet 110 to the memory subsystem 102, the memory subsystem 102 spends a certain period of time (e.g., 10 microseconds) to spool up sufficient data so that the timing requirements of the display device 104 are met. One way to satisfy the timing requirements is to provide data to the display device 104 every clock cycle. After the spool-up period, the memory subsystem 102 sends a contract-ready packet 112 back to the head as designated in the HEAD field of the contract packet 110. The delivery of the contract-ready packet 112 signifies that the memory subsystem 102 is committed and prepared to deliver all the requested pixels in an order dictated by the ROTATION field of the contract packet 110 and according to the pixel clock rate. In other words, the display device 104 at this time will receive the requested pixels at the pixel clock rate. After handling all the requests specified in the contract packet 110, the memory subsystem 102 sends a credit packet 114 to the display device 104 indicating that it is available to receive another contract.

After the issuance of the contract-ready packet 112, the memory subsystem 102 can start sending one or more data-transferred packets 116 containing data from the buffer as designated in the BUFFER field of the contract packet 110. Suppose the END_NEAR_LINES is set to 3 in the contract packet 110. If there are 3 lines remaining to be read out from the designated buffer, then the memory subsystem 102 sends a near-complete packet 118 to alert the display device 104 of the impending completion of the data transfer. After the memory subsystem 102 delivers all the requested pixels to the display device 104, the memory subsystem 102 sends a contract-complete packet 120 to the display device 104.

Figure 1E:
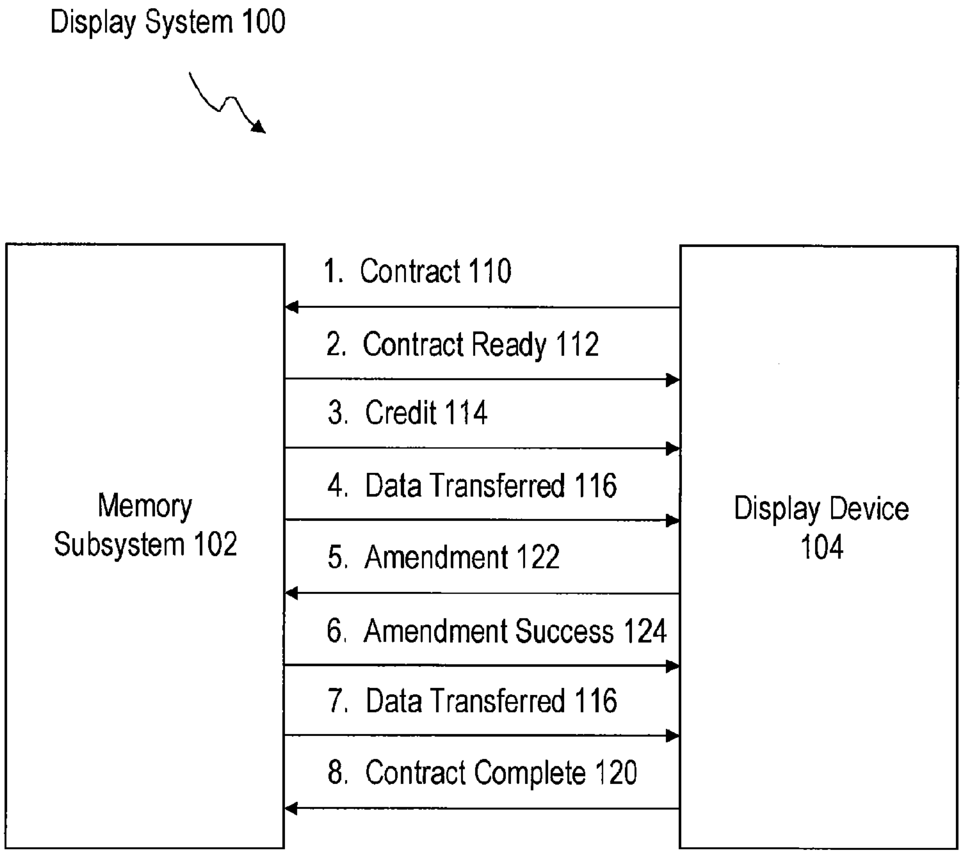
FIG. 1E a conceptual diagram illustrating a contract-based communication session involving a contract amendment between a memory subsystem and a display device, according to one embodiment of the present invention.

As long as the contract 110 is still pending (i.e., the display device 104 has not received the contract-complete packet 118), the display device 104 may amend the contract 110. FIG. 1E a conceptual diagram illustrating a contract-based communication session involving a contract amendment between a memory subsystem and a display device, according to one embodiment of the present invention. To illustrate, suppose before the memory subsystem 102 completes transferring data, the display device 104 issues an amendment packet 122. Suppose the BUFFER field of the pending contract 110 designates the buffer 0 in the base 152, and the line n of the buffer 0 is being scanned out when the memory subsystem 102 receives the amendment packet 122. Suppose further that the amendment packet 122 intends to change the base address 0 to the base address 1. In response to the amendment packet 122, the next line memory subsystem 102 scans out becomes the line n+1 of the buffer 1, not the initial buffer 0. The memory subsystem 102 also sends an amendment-success packet 124 to the display device 104, because the amendment packet 122 indeed takes effect in this example.

It is worth noting that each of the packets shown in FIGS. 1A and 1E is associated with a particular message, such as contract, contract-ready, credit, data-transferred, amendment, amendment-success, near-complete, and contract-complete. These messages are referred to as "meta-messages" in this disclosure. Although specific meta-messages are provided to illustrate aspects of the present invention, it should be apparent to a person with ordinary skills in the art to recognize that these meta-messages can be modified or supplemented without exceeding the scope of the claimed invention.

Figure 2:
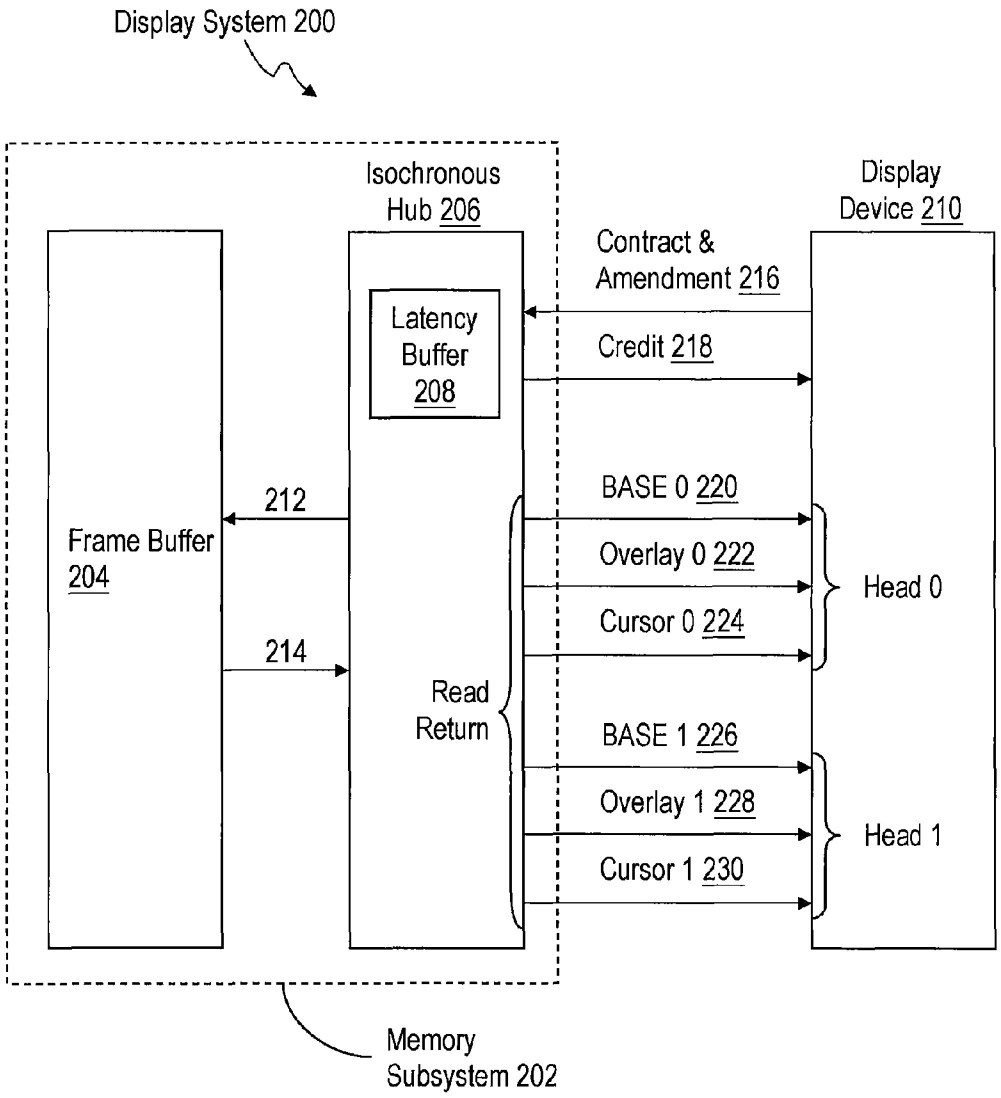
FIG. 2 is a simplified diagram of a display system utilizing an isochronous hub to facilitate contract-based communications, according to one embodiment of the present invention.

FIG. 2 is a simplified diagram of a display system utilizing an isochronous hub to facilitate contract-based communications, according to one embodiment of the present invention. In particular, a display system 200 includes a display device 210 and a memory subsystem 202. The memory subsystem 202 further includes a frame buffer 204 and an isochronous hub 206. In one implementation, the isochronous hub 206 interacts with one or more low-level memory controllers via a crossbar mechanism to manage multiple partitions in the frame buffer 204. In general, the isochronous hub 206 sends requests for data to the frame buffer 204 via an interface 212 and receives the requested data from the frame buffer 204 via an interface 214. The isochronous hub 206 also includes a latency buffer 208 to store the spooled-up data from the frame buffer 204 to ensure data is transmitted to the display device 210 every clock cycle.

There are also multiple interfaces between the isochronous hub 206 and the display device 210. In one implementation, the isochronous hub 206 supports an interface 216 (e.g., 16 bits wide) for exchanging contracts and amendments and an interface 218 for exchanging credits with all the heads of the display device 210. Here, in response to a received contract, the isochronous hub 206 issues a credit to the display device 210 after it completes issuing all the requests for the received contract to the frame buffer 204, and the frame buffer 204 finishes handling the requests internally.

In FIG. 2, the display device 210 supports two heads. For each of the two heads, the isochronous hub 206 supports a number of interfaces, each of which carries data from a particular type of buffer in the frame buffer 204. Specifically, for head 0, an interface 220 carries the data from a base 0; an interface 222 carries data from an overlay 0; and an interface 224 carries data from a cursor 0. Similarly, for head 1, interfaces 226, 228, and 230 carry data from a base 1, an overlay 1, and a cursor 1, respectively. These interfaces for head 0 and head 1 are collectively referred to as "read return interfaces". In one implementation, the read return interfaces not only carry the requested pixel data, but they also carry certain meta-messages.

To illustrate how the isochronous hub 206 communicates with the display device 210 via the read return interfaces, suppose the isochronous hub 206 receives a contract packet via the interface 216 requesting the guaranteed delivery of data from the buffer, base 0, in the frame buffer 204 to head 0 of the display device 210. Following the sequence discussed above and illustrated in FIG. 1A, after the isochronous hub 206 spools up sufficient amount of data from base 0 and stores the data in the latency buffer 208 to deliver data to the display device 210 every clock cycle, it sends the contract-ready meta-message to head 0 through all three of the interfaces 220, 222, and 224. It is worth noting that in some exceptional situations where the clock speeds of the memory subsystem 202 and the display device 210 deviate significantly, one embodiment of the isochronous hub 206 introduces bubbles, or dummy data, into the data streams to the display device 210.

On the other hand, for the delivery of the requested pixel data, the isochronous hub 206 sends the data through only the interface 220, because the contract in this example specifically designates the base 0 buffer. As for the subsequent near-complete and the contract-complete meta-messages, the isochronous hub 206 again sends them through all three of the interfaces 220, 222, and 224. If the isochronous hub 206 receives an amendment packet via the interface 216 instead, then in addition to the aforementioned meta-messages, the isochronous hub 206 also sends the amendment-success meta-message through all three of the interfaces.

In one implementation, even if overlay 0 or cursor 0 does not contain any pixel data, the isochronous hub 206 still sends the meta-messages through the interfaces 222 and 224. By consistently sending the meta-messages along with the pixel data through the same interfaces according a certain sequence of events in time, such as the sequences shown in FIG. 1A and FIG. 1E, the meta-messages on each of the read return interfaces are as a result ordered with respect to the pixel data that are also on the interface.

Figure 3:
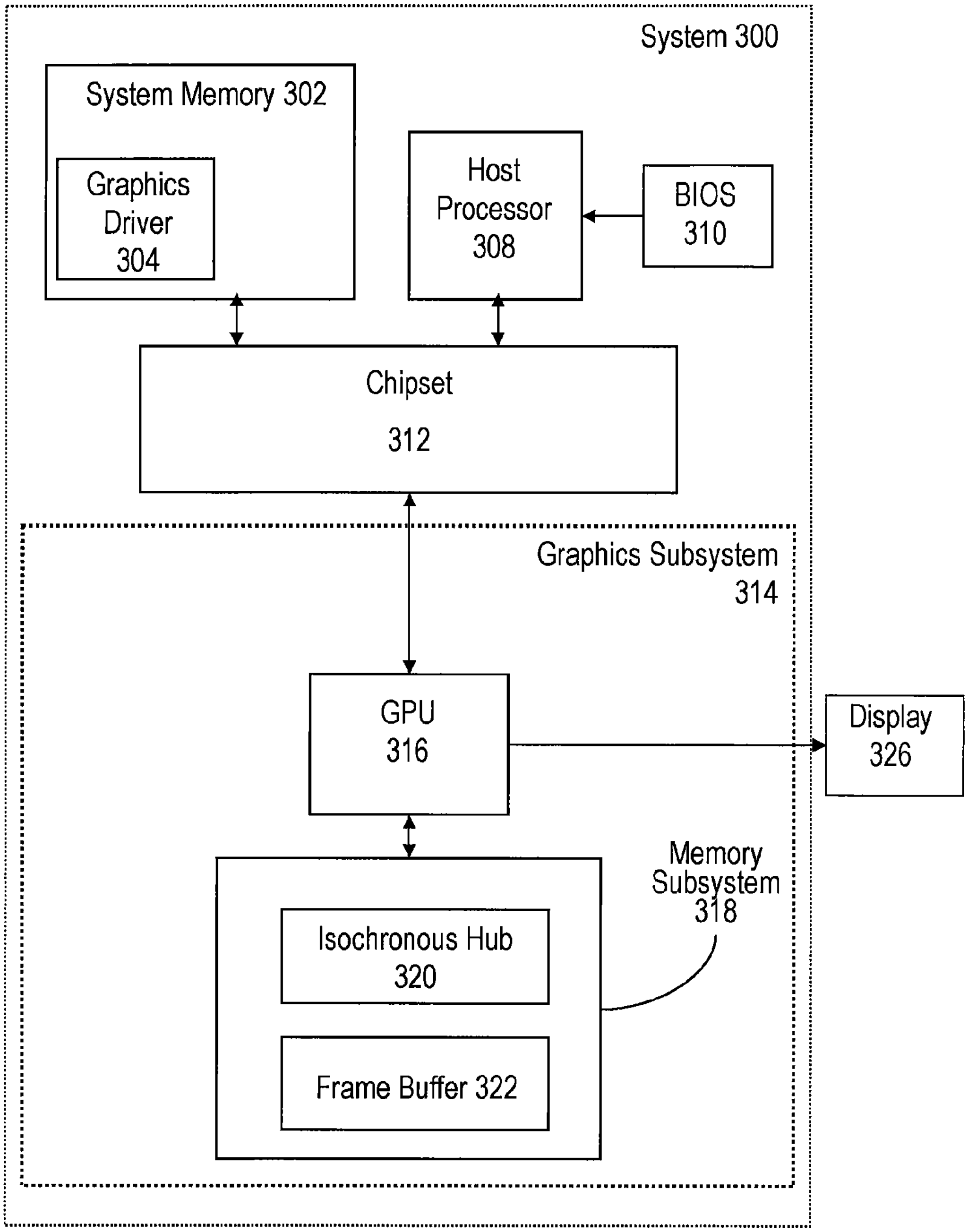
FIG. 3 is a block diagram of a system configured to implement one or more aspects of the present invention.

FIG. 3 is a block diagram of a system configured to implement one or more aspects of the present invention. Without limitation, system 300 may be a desktop computer, server, laptop computer, palm-sized computer, tablet computer, game console, cellular telephone, hand-held device, mobile device, computer based simulator, or the like. System 300 includes a host processor 308, BIOS 310, system memory 302, and a chipset 312 that is directly coupled to a graphics subsystem 314. BIOS 310 is a program stored in read only memory ("ROM") or flash memory that is run at bootup. The graphics subsystem 314 includes a graphics processing unit ("GPU") 316. In alternate embodiments, the host processor 308, the GPU 316, the chipset 312, or any combination thereof, may be integrated into a single processing unit. Further, the functionality of the GPU 316 may be included in a chipset or in some other type of special purpose processing unit or co-processor.

A graphics driver 304, stored within the system memory 302, configures the GPU 316 to share the graphics processing workload performed by the system 300 and communicate with applications that are executed by the host processor 308. In one embodiment, the graphics driver 304 generates and places a stream of commands in a "push buffer." When the commands are executed, certain tasks, which are defined by the commands, are carried out by the GPU 316.

In some embodiments of the system 300, the chipset 312 provides interfaces to the host processor 308, memory devices, storage devices, graphics devices, input/output ("I/O") devices, media playback devices, network devices, and the like. It should be apparent to a person skilled in the art to implement the chipset 312 in two or more discrete devices, each of which supporting a distinct set of interfaces.

The GPU 316 is responsible for outputting image data to a display 326. The Display 326 may include one or more display devices, such as, without limitation, a cathode ray tube ("CRT"), liquid crystal display ("LCD"), or the like. The display device 210 shown in FIG. 2 is a part of the GPU 316. The GPU 316 is also coupled to a memory subsystem 318, which in one embodiment corresponds to the memory subsystem 202 shown in FIG. 2. The memory subsystem 318 further includes an isochronous hub 320 and frame buffer 322.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for transmitting display data to a display device, comprising:

receiving a contract for a frame of display data from the display device, wherein the contract includes a message that specifies a plurality of pixels to transmit to a display device and a rotation value that specifies an order in which the pixels are transmitted to the display device;

transmitting a meta-message to the display device that indicates a commitment to transmit the frame of display data according to the contract;

according to the contract, preparing the frame of display data to ensure the timing requirements of the display device can be satisfied; and transmitting the frame of display data to the display device while the contract is pending.

2. The method of claim 1, wherein the contract includes a plurality of parameters designating a source to retrieve the frame of display data and a destination at the display device to send the frame of display data.

3. The method of claim 2, further comprising transmitting a second meta-message to the display device, wherein the second meta-message indicates the status associated with transmitting the frame of display data.

4. The method of claim 3, further comprising transmitting the frame of display data to the destination via a read return interface corresponding to the source.

5. The method of claim 4, further comprising transmitting the second meta-message and the frame of display data to the destination via the same read return interface.

6. The method of claim 5, wherein the second meta-message triggers the origination of a new contract.

7. The method of claim 3, further comprising transmitting the second meta-message even if there is no display data to retrieve from the source.

8. The method of claim 2, further comprising amending the contract if the contract is pending.

9. The method of claim 8, further comprising:

amending the base address associated with the source; and retrieving the frame of display data based on the amended base address.

10. The method of claim 1, further comprising providing data from the frame of display data every clock cycle to the display device.

11. A computing device configured to transmit display data to a display device, the computing device comprising:

an isochronous hub, and a frame buffer, managed by the isochronous hub, wherein the isochronous hub is configured to:

receive a contract for a frame of display data in the frame buffer from the display device, wherein the contract includes a message that specifies a plurality of pixels to transmit to a display device and a rotation value that specifies an order in which the pixels are transmitted to the display device;

transmit a meta-message to the display device that indicates a commitment to transmit the frame of display data according to the contract;

according to the contract, prepare the frame of display data to ensure the timing requirements of the display device can be satisfied; and transmit the frame of display data to the display device while the contract is pending.

12. The computing device of claim 11, wherein the contract includes a plurality of parameters designating a source at the frame buffer to retrieve the frame of display data and a destination at the display device to send the frame of display data.

13. The computing device of claim 12, wherein the isochronous hub is further configured to transmit a second meta-message to the display device, wherein the second meta-message indicates the status associated with the transmission of the frame of display data.

14. The computing device of claim 13, wherein the isochronous hub is further configured to transmit the frame of display data to the destination via a read return interface corresponding to the source.

15. The computing device of claim 14, wherein the isochronous hub is further configured to transmit the second meta-message and the frame of display data to the destination via the same read return interface.

16. The computing device of claim 15, wherein the second meta-message triggers the display device to originate a new contract.

17. The computing device of claim 13, wherein the isochronous hub is further configured to transmit the second meta-message even if there is no display data to retrieve from the source.

18. The computing device of claim 12, wherein the display device is further configured to amend the contract if the contract is pending.

19. The computing device of claim 18, wherein the isochronous hub is further configured to:

amend the base address associated with the source; and retrieve the frame of display data based on the amended base address.

20. The computing device of claim 11, wherein the isochronous hub is further configured to provide data from the frame of display data every clock cycle to the display device.

* * * * *